W. P. BURROW & H. B. NICHOLS.
BALE-TIE.

No. 172,845. Patented Feb. 1, 1876.

Witnesses:
W. E. Chaffee
Harry Coleman

Inventor:
W. P. Burrow
H. B. Nichols
by J. W. C. Perkins, Attorneys.

UNITED STATES PATENT OFFICE.

WALTER P. BURROW AND HENRY B. NICHOLS, OF NORFOLK, VIRGINIA.

IMPROVEMENT IN BALE-TIES.

Specification forming part of Letters Patent No. 172,845, dated February 1, 1876; application filed November 15, 1875.

*To all whom it may concern:*

Be it known that we, WALTER P. BURROW and HENRY B. NICHOLS, of Norfolk, in the county of Norfolk and State of Virginia, have invented certain new and useful Improvements in Cotton-Ties; and we do hereby declare the following to be a full, clear, and exact description of the invention, such as will enable others skilled in the art to which it pertains to make and use it, reference being had to the accompanying drawings, which form part of this specification.

Figure 1:
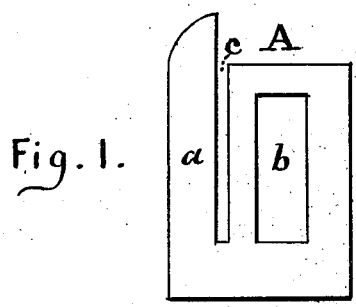
Figure 2:
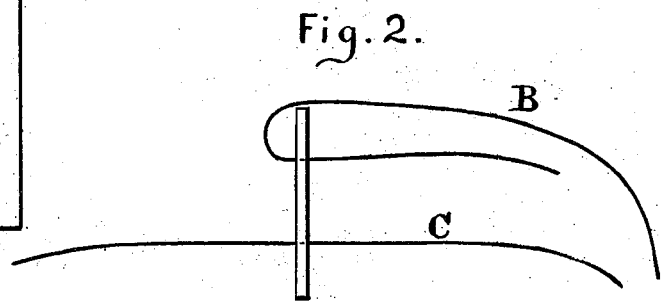
Figure 3:
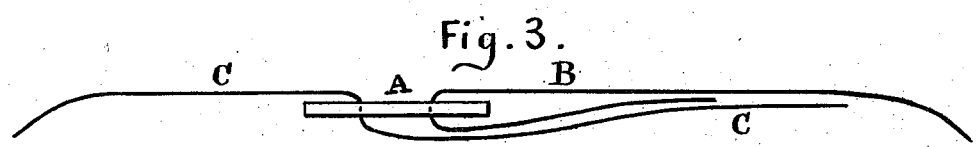
Figure 4:
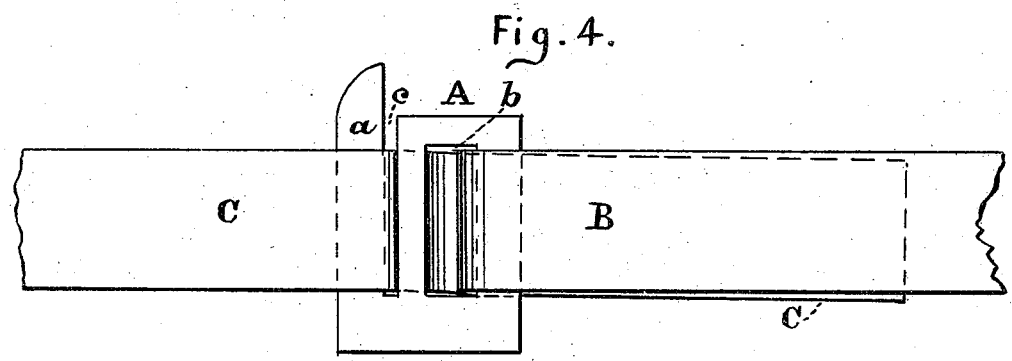

Figure 1 represents a plan view of the plate forming the keeper. Fig. 2 represents side view of the bale-tie, partly adjusted. Fig. 3 represents side view of the tie clasped or locked. Fig. 4 represents plan view of tie clasped or locked.

A designates the plate forming the keeper, provided with arm $a$, which is projected or slightly longer than the main portion of the keeper, with oblong opening $b$, and narrow slot $c$, as exhibited in Fig. 1.

B indicates one end of the band, formed into a hook or loop by being bent over the top of the keeper, and then brought back through the slot $b$; and C, other end of the said band, and placed through the opening $c$ after being brought under and around the bale that is desired to be fastened or pressed, as exhibited in Fig. 2. The tie or keeper A consists of a nearly square or rectangular piece of iron or other metal, of proper thickness to make it sufficiently strong. At one end is a slot, $b$, which is of such size as to admit of the free passage through of the band that is intended to pass around the bale to be pressed. At the other end of said tie or keeper is an oblong opening, $c$, also of sufficient size only as to admit of the free passage through of said band, and also the arm $a$, which is so made as to project about one-fourth of an inch beyond the main part of said plate or keeper, which said projection is for the purpose of facilitating the placing the band in and through said opening $c$, as exhibited in Fig. 1.

The process of fastening or locking said tie is as follows: The band is placed first through the opening $b$, after passing over the top of said plate or keeper, and bent under in the usual manner behind the press, the plate being held in a perpendicular position; after which the said band is quickly inserted and brought under and around the bale to be pressed, and the other end of said band is slipped in and through said narrow slot $c$; after which the pressure of the bale when released from its compressed position is allowed to force itself against the band, thus making the tie self-locking by forcing the plate or keeper parallel with and against said bale, as shown in Fig. 4. By means of a tie, made as heretofore described, a great reduction is made in the size of the bale, for the reason that no slack is lost in the size of the bale when in the press, except the exact size of the depth of said plate when held in a perpendicular manner and the ends of the band are covered and out of the way.

In bending the band about the bale the slack of the same is taken up, the band touching the bale all around before the pressure on the same is removed, thus securing a great saving of size and time, material and expense. There is no cutting or alteration of the band after it is once locked or tied, as heretofore described. The time of making the band fast is reduced nearly one-half over any other tie-fastener, and is also simple, made at less expense, and used with less labor.

We do not claim as our invention a tie with an open and a closed slot, said tie being made from a rectangular piece of metal. This would not serve the same purpose as our invention; but What we do claim, and desire to secure by Letters Patent, is—

The cotton-bale tie A, provided with an arm, $a$, elongated beyond the main portion of the tie in combination with the band having its ends B and C bent and fastened, as shown and described.

In testimony that we claim the foregoing, we have hereunto set our hands this 13th day of October, 1875.

HENRY B. NICHOLS.
WALTER P. BURROW.

Witnesses as to signature of H. B. NICHOLS:
S. A. TERY,
JOS. P. SPANIER.

Witnesses as to signature of W. P. BURROW:
EDWIN LIGHTFOOT,
J. A. JACKSON.